(12) United States Patent
Kim

(10) Patent No.: US 6,886,818 B2
(45) Date of Patent: May 3, 2005

(54) ENGINE MOUNTING STRUCTURE

(75) Inventor: Ki-Chang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/315,810

(22) Filed: Dec. 10, 2002

(65) Prior Publication Data

US 2003/0178753 A1 Sep. 25, 2003

(30) Foreign Application Priority Data

Mar. 25, 2002 (KR) .......................... 2002-16072

(51) Int. Cl.$^7$ ................................ F16F 13/00
(52) U.S. Cl. ............. 267/140.13; 180/299; 296/203.02; 296/30
(58) Field of Search ................ 180/312, 299; 296/29, 30, 187.08, 187.09, 204, 203.02; 267/139, 140.11, 140.13, 140.5, 141

(56) References Cited

U.S. PATENT DOCUMENTS

| | | | |
|---|---|---|---|
| 3,702,178 A | * 11/1972 | Schulz ................... 267/140.3 |
| 4,240,517 A | * 12/1980 | Harlow et al. ............. 180/295 |
| 4,288,063 A | 9/1981 | Brenner et al. |
| 4,335,797 A | * 6/1982 | Simmons ................. 180/69.22 |
| 4,492,366 A | 1/1985 | Ozawa et al. |
| 4,537,381 A | * 8/1985 | Arai ........................... 248/559 |
| 4,635,906 A | 1/1987 | Buma |
| 4,700,933 A | 10/1987 | Chikamori et al. |
| 5,018,699 A | * 5/1991 | Bretaudeau et al. ........ 248/562 |
| 5,035,407 A | 7/1991 | Takeguchi et al. |
| 5,080,331 A | 1/1992 | de Fontenay |
| 5,393,040 A | 2/1995 | Ueno et al. |
| 5,472,063 A | * 12/1995 | Watanabe et al. ........... 180/274 |
| 5,947,226 A | * 9/1999 | Bellamy et al. ............. 180/299 |
| 5,964,456 A | * 10/1999 | Someya ................. 267/140.13 |
| 6,073,918 A | 6/2000 | Kojima et al. |
| 6,170,810 B1 | 1/2001 | Satori et al. |
| 6,374,939 B1 | * 4/2002 | Hohnstadt et al. .......... 180/299 |
| 6,443,438 B2 | * 9/2002 | Satori et al. ........... 267/140.13 |
| 6,543,756 B2 | * 4/2003 | Ihara et al. ............ 267/140.13 |
| 6,568,363 B2 | * 5/2003 | Koyama et al. ........ 123/195 A |

FOREIGN PATENT DOCUMENTS

| | | | |
|---|---|---|---|
| JP | 976945 | * | 3/1997 |
| JP | 200163630 | * | 3/2001 |
| JP | 2001278116 | * | 10/2001 |
| JP | 2003118516 | * | 4/2003 |
| KR | 2001066532 | * | 7/2001 |
| KR | 2003027409 | * | 4/2003 |

* cited by examiner

Primary Examiner—Robert A. Sicondefi
Assistant Examiner—Devon Kramer
(74) Attorney, Agent, or Firm—Morgan Lewis & Bockius LLP

(57) ABSTRACT

The vehicular engine mounting structure includes a liquid sealed type bush instead of a rubber embedded bush. The mounting structure also includes: a chassis bracket having a circular supporter for receiving the bush. Two attachment parts of the chassis bracket are coupled to at a front side member. Vertical reinforcing members and a connection reinforcing member for supporting the vertical reinforcing members are installed in the front side member.

14 Claims, 3 Drawing Sheets

ENGINE MOUNTING STRUCTURE

FIELD OF THE INVENTION

The present invention relates to an engine mounting structure, and more particularly, to a vehicular engine mounting structure. The vehicular engine mounting structure improves performance of an engine mounting bush and absorbs vibration at a vibration input unit where engine vibration is transferred to a vehicular body.

BACKGROUND OF THE INVENTION

The vibration caused by the engine and noise level within the interior of the vehicle affects the riding comfort and quality of the vehicle. As a result, new vehicular engine mounting structures have been developed to better absorb vibration.

Conventional mounting structures mount to a vehicle chassis via a rubber bush. However, these rubber bushes absorb vibration by elasticity of the embedded rubber, making it difficult to further reduce vibration through material or structural changes of the bush. Furthermore, it is generally necessary to include additional members to reinforce and support the mounting structure. The additional members increase the cost and complexity of the mounting structure. In addition, the strength of an engine vibration input unit, which is the initiation point for transmitting engine vibration to the vehicular body where the mounting structure is fixed to the chassis, has a great influence on the transmission level of the vibration. Such engine vibration input parts are poorly constructed resulting in poor strength and insufficient insulation from the vibration.

SUMMARY OF THE INVENTION

The present invention provides a vehicular engine mounting structure for improving the amount of engine vibration primarily absorbed by a bush, making a chassis bracket easily mounted in an application of the bush, and increasing the internal strength of a front side member part where the chassis bracket is mounted, thereby reducing the amount of engine vibration transmitted to the interior of the vehicle and improving riding comfort and interior sound of the vehicle.

In accordance with an embodiment of the present invention, a vehicular engine mounting structure comprises a chassis bracket fixed at a front side member and a fender apron inner panel, a liquid sealed bush mounted at the chassis bracket and fixed at an engine by way of an engine bracket, two vertical reinforcing members installed at an inner side of the front side mounted part, and a connection reinforcing member for supporting the vertical reinforcing members.

Further, according to another embodiment of the invention there is also provided an engine mounting structure. The engine mounting structure includes a chassis bracket and a bush. The chassis bracket is coupled to a vehicle chassis, preferably at a front side member and a fender apron inner panel. The bush is liquid sealed type bush that is mounted within the chassis bracket. The bush is also coupled to an engine via an engine bracket. The engine mounting structure further includes at least one reinforcing member installed at an inner side of the front side member. The engine mounting structure also preferably includes a connection reinforcing member for supporting the at least one vertical reinforcing member. The chassis bracket preferably comprises a supporting part formed at a center of the chassis bracket for receiving the bush and at least one attachment part formed at a side of the supporting part. The at least one attachment part is configured to be bolted to the front side member. The chassis bracket also preferably comprises a stay formed between the attachment parts for being bolted to the fender apron inner panel. The at least one reinforcing members preferably has an upper flange, and lateral flanges. The upper and lower flanges are welded at an upper and lower side of the side member. The upper flange includes a first bolt hole aligned with a second bolt hole formed at the attachment part for receiving a bolt. The lateral flanges of the vertical reinforcing members and lateral flanges of the connection reinforcing member are formed with complimentary concave-convex surfaces for ease of welding. Foam may also be injected into an installation space about the at least one reinforcing member and the connection reinforcing member.

Therefore, the bush can absorb greater amount of vibration and the coupling strength of the chassis bracket mounting part of the front side member is improved. As a result, the present invention is more advantageous in effectively suppressing the engine vibration and noise in the interior of the vehicle.

BRIEF DESCRIPTION OF THE DRAWINGS

The features and advantages of the present invention will be more apparent from the detailed description of the present invention with reference to the attached drawings in which.

DETAILED DESCRIPTION OF THE INVENTION

Figure 1:
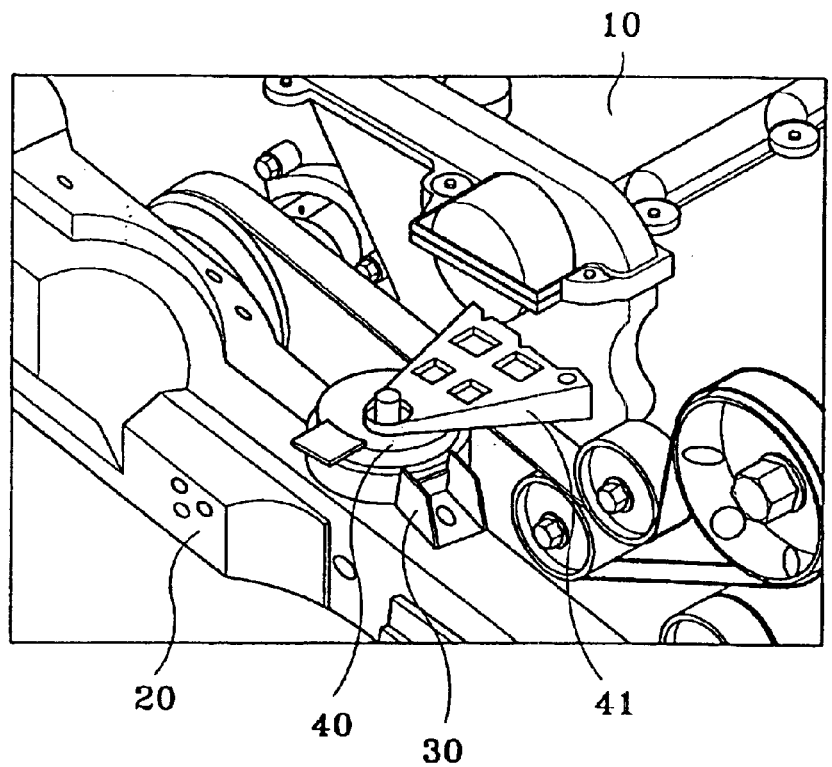
FIG. 1 is a perspective view illustrating an engine mounting part in accordance with an embodiment of the present invention.
Figure 2:
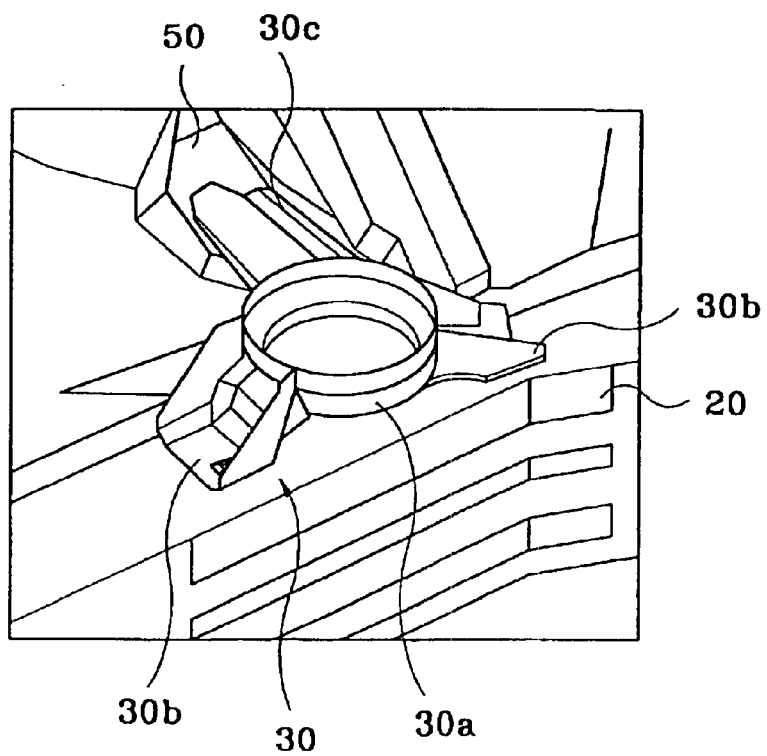
FIG. 2 is a perspective view illustrating an installation state of an engine mounting bracket in accordance with an embodiment of the present invention where an engine is not mounted.

As shown in FIG. 1, a bush 40 according to the present invention has a circular shape. An end of engine bracket 41 is fastened to the bush 40 at a bolt formed at the center point of the upper side of the bush 40, thereby connecting the engine 10 to the chassis.

The bush 40 may be made of elastic rubber, or a liquid sealed type of elastic rubber material where liquid is contained to generate a damping force by fluidity. By keeping its absorbing capacity constant regardless of directions of input vibration the bush 40 has better vibration absorption capabilities. (There is no difference in the amount of vibration to be absorbed by reducing horizontal and vertical vibration.)

The chassis bracket 30 is formed with a circular supporting part 30a at the center thereof, attachment parts 30b at both sides of the supporting part 30a, and a stay 30c between the attachment parts 30b. The bush 40 is compressed and attached to the chassis at the supporting part 30a. The attachment parts 30b are bolted to an upper side of a side member 20, and the stay 30c is bolted to a fender apron inner panel 50.

Figure 3:
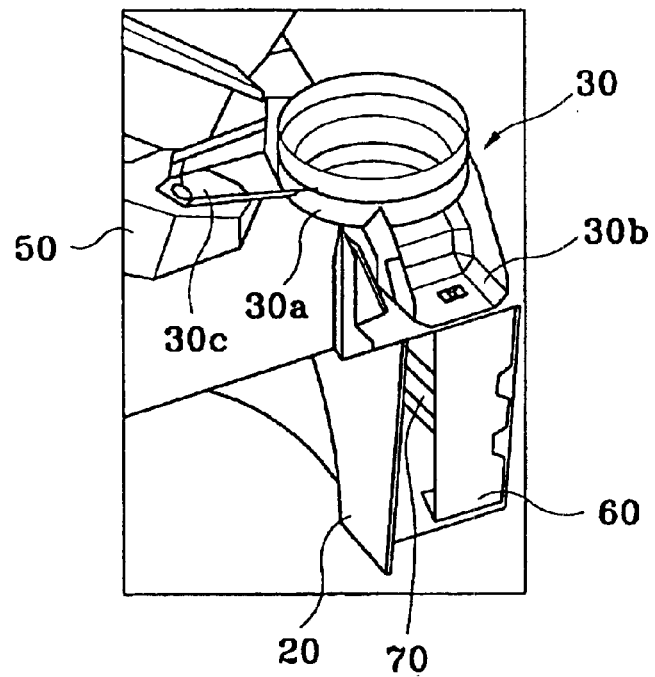
FIG. 3 is a perspective view illustrating a cross-section of the left part of FIG. 2.
Figure 4:
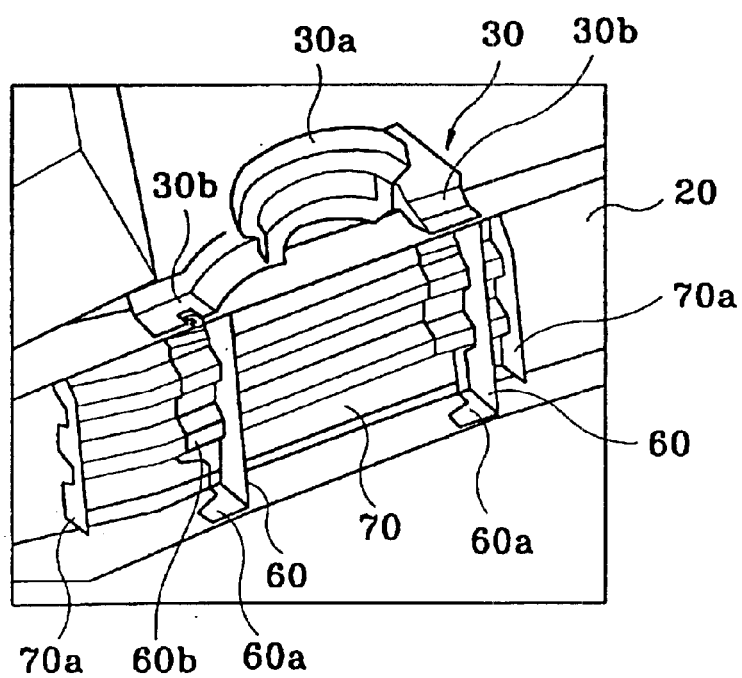
FIG. 4 is a perspective view illustrating a front cross-section of FIG, 2.

As shown in FIGS. 3 and 4, two vertical reinforcing members 60 and connection reinforcing members 70, used to connect and support the vertical reinforcing members 60, are installed at the inner side of the side member 20 where the chassis bracket 30 is mounted. The vertical reinforcing members 60 are placed under the attachment parts 30b of the chassis brackets 30 with flanges 60a, and 60b at the upper, lower and lateral sides thereof. The upper and lower flanges 60a are welded at the upper and lower sides of the internal part of the side member 20. A bolt hole is formed at a position of the upper flange which is in communication with the bolt hole formed at the side member 20 for insertion of a bolt to attach the fixing pieces 30b. The lateral flanges 60b are preferably formed with a concave-convex surface, as shown in FIG. 4. Accordingly, the connection reinforcing member 70 connecting the vertical reinforcing members 60 is formed with a similar concave-convex surface to the lateral flange 60b for well-matched welding. Vertical surfaces 70a are formed at both ends of the connection reinforcing member 70 to prevent vertical strength deterioration caused by formation of the concave-convex surface.

As described above, the bush 40 is preferably made from a liquid sealed type of an elastic rubber material, so as to increase the amount of absorbed vibration and noise in comparision to the conventional bush 40'. This also keeps a vibration absorbing capacity constant regardless of the vibration inputting direction.

In addition, the chassis bracket 30 does not require an additional part for installation of the bush 40, but can be conveniently mounted when the fixing pieces 30b and the stay 30c are simply bolted at the front side member 20 and the fender apron inner panel 50. Both fixing pieces 30b of the chassis bracket 30 are supported by the upper surface of the front side member 20 and its internal vertical reinforcing member 60, so as to improve the strength of the engine vibration inputting part and disperse the inputted vibration to the vertical reinforcing members 60 and the connection reinforcing member 70 connecting the vertical reinforcing members 60. As a result, it becomes difficult to transmit the vibration through the side member 20.

Figure 5:
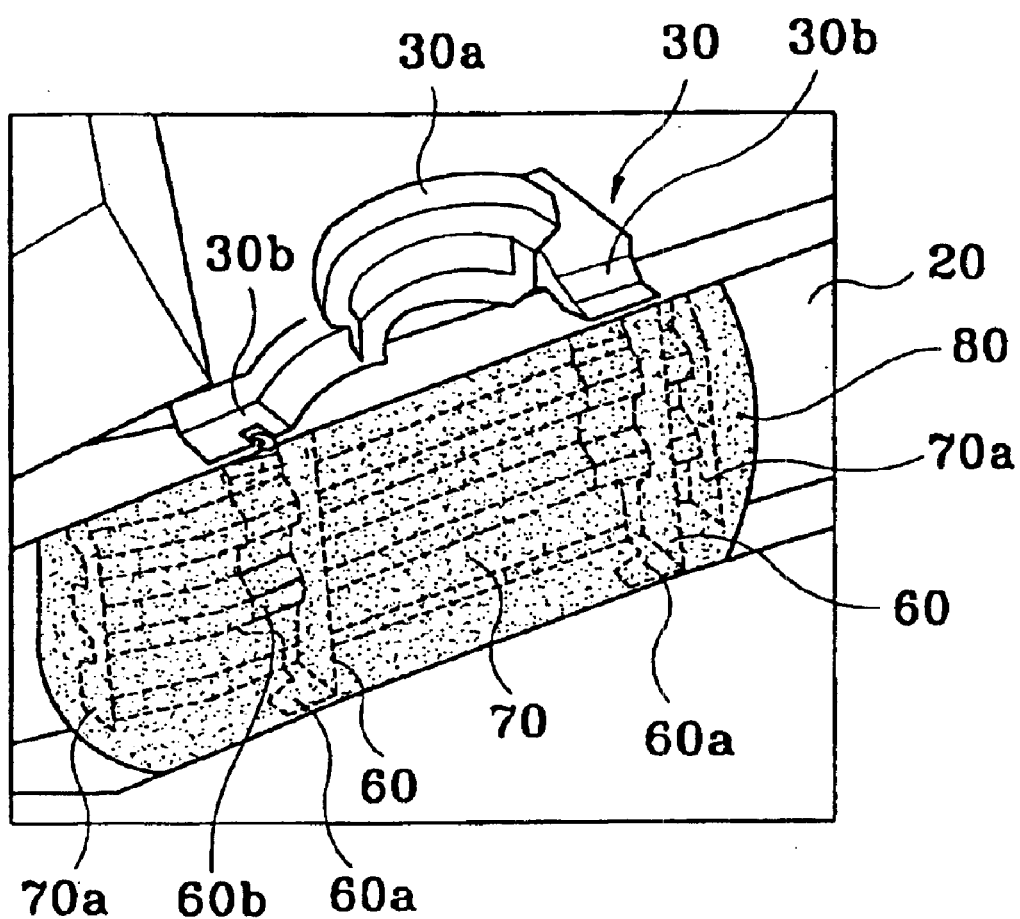
FIG. 5 illustrates a state where foam is filled in a space illustrated in FIG. 4.

When foam 80 (FIG. 5) is filled in the installation space of the vertical reinforcing member 60 and the connection reinforcing member 70, it is possible to increase the coupling strength between the vertical reinforcing member 60 and the connection reinforcing member 70 and reduce local vibration at the same time, thereby more effectively isolating engine vibration transmittance through the side member 20.

As described above, the liquid sealed type of a bush increases the strength of the engine vibration inputting part of the front side member, where the chassis bracket is mounted, thereby more effectively isolate engine vibration and noise and improving riding comfort and sound within the interior of the vehicle. In addition, the number of parts needed for installation of the chassis bracket is reduced, reducing assembly complexity and costs.

What is claimed is:

1. An engine mounting structure, comprising:
   a chassis bracket adapted to be coupled to a front side member and a fender apron inner panel;
   a liquid sealed type bush mounted within the chassis bracket, where said bush is coupled to an engine via an engine bracket;
   two vertical reinforcing members installed at an inner side of the front side member; and
   a connection reinforcing member for supporting the vertical reinforcing members;
   wherein said chassis bracket comprises a supporting part formed at a center thereof for receiving the bush; attachment parts formed at both sides of the supporting part for being bolted to said front side member; and a stay formed between the attachment parts for being bolted to the fender apron inner panel.

2. The mounting structure of in claim 1, wherein the vertical reinforcing members have flanges at upper, lower and lateral sides thereof, where upper and lower flanges are welded to upper and lower sides of the side member, the upper flange including a bolt hole formed to align with another bolt hole formed at the attachment part for receiving a bolt.

3. The mounting structure of claim 1, wherein a lateral flange of said vertical reinforcing members and the connection reinforcing member are formed with a concave-convex surface for welding.

4. The mounting structure of claim 1, wherein foam is filled in an installation space of said vertical reinforcing members and said connection reinforcing member.

5. An engine mounting structure, comprising:
   a chassis bracket coupled to a vehicle chassis;
   a liquid sealed type bush mounted within said chassis bracket, where said liquid sealed type bush is coupled to an engine via an engine bracket; and
   at least one vertical reinforcing member installed at an inner side of a front side member;
   wherein said chassis bracket is mounted to a front side member and a fender apron inner panel of said vehicle chassis, said engine mounting structure further comprising at least one vertical reinforcing member installed at an inner side of said front side member, and wherein said chassis bracket further comprises a stay formed between attachment parts configured and dimensioned for being bolted to the fender apron inner panel.

6. The engine mounting structure of claim 5, further comprising a connection reinforcing member for supporting said at least one vertical reinforcing member.

7. The engine mounting structure of claim 5, wherein said chassis bracket comprises:
   a supporting part formed at a center of said chassis bracket for receiving said bush;
   at least one attachment part formed at a side of said supporting part, where said at least one attachment part is configured to be bolted to said front side member.

8. The structure as defined in claim 5, wherein said at least one reinforcing members has an upper flange, a lower flange, and lateral flanges, where said upper and lower flanges are welded at an upper and lower side of said side member, the upper flange including a first bolt hole aligned with a second bolt hole formed at an attachment part for receiving a bolt.

9. The structure as defined in claim 8, wherein said lateral flanges of said vertical reinforcing members and lateral flanges of a connection reinforcing member are formed with complementary concave-convex surfaces for ease of welding.

10. The structure as defined in claim 5, wherein foam is injected into an installation space about said at least one reinforcing member and a connection reinforcing member.

11. An engine mounting structure, comprising:
    a chassis bracket adapted to be coupled to a front side member and a fender apron inner panel, wherein said chassis bracket comprises;
    a supporting part formed at a center of said chassis bracket;

attachment parts formed at both sides of the supporting part configured and dimensioned to be coupled to said front side member;

a stay formed between said attachment parts for coupling to the fender apron inner panel;

a liquid sealed type bush mounted within the chassis bracket, where said bush is coupled to an engine via an engine bracket;

at least one vertical reinforcing member installed at an inner side of the front side member; and a connection reinforcing member for supporting the vertical reinforcing member.

12. An engine mounting structure, comprising:

a chassis bracket adapted to be coupled to a front side member and a fender apron inner panel;

a liquid sealed type bush mounted within the chassis bracket, where said bush is coupled to an engine via an engine bracket;

at least one vertical reinforcing member installed at an inner side of the front side member; and a connection reinforcing member for supporting the vertical reinforcing member;

wherein the vertical reinforcing member has flanges at upper, lower and lateral sides thereof, where the upper and the lower flanges are coupled to upper and lower sides of the front side member, the upper flange defining a hole formed therein to align with a hole defined by an attachment part for receiving a bolt.

13. An engine mounting structure, comprising:

a chassis bracket adapted to be coupled to a front side member and a fender apron inner panel;

a liquid sealed type bush mounted within the chassis bracket, where said bush is coupled to an engine via an engine bracket;

at least one vertical reinforcing member installed at an inner side of the front side member; and a connection reinforcing member for supporting the vertical reinforcing member;

wherein a lateral flange of said vertical reinforcing member and the connection reinforcing member are formed with a concave-convex surface for coupling together.

14. An engine mounting structure, comprising:

a chassis bracket coupled to a front side member and a fender apron inner panel of a vehicle chassis;

at least one vertical reinforcing member installed at an inner side of said front side member, wherein said at least one vertical reinforcing member has an upper flange, a lower flange, and lateral flanges, said upper and lower flanges being coupled at an upper and lower side of said side member, the upper flange defining a first through hole aligned with a second through hole formed at an attachment part, wherein said lateral flanges of said vertical reinforcing members and lateral flanges of a connection reinforcing member are formed with complementary concave-convex surfaces for ease of coupling; and a liquid sealed type bush mounted within said chassis bracket, where said liquid sealed type bush is coupled to an engine via an engine bracket.

\* \* \* \* \*